United States Patent Office 3,371,111
Patented Feb. 27, 1968

3,371,111
PROCESS FOR PRODUCING ETHOXY NAPHTHOIC ACID
Joseph Levy, Paramus, and William W. Walker, Rutherford, N.J., assignors to Universal Oil Products Company, Des Plaines, Ill., a corporation of Delaware
No Drawing. Filed July 14, 1965, Ser. No. 472,007
6 Claims. (Cl. 260—520)

This invention relates to a process for the preparation of 2-ethoxy-1-naphthoic acid.

Heretofore 2-ethoxy-1-naphthoic acid, which is a valuable industrial chemical, particularly as a pharmaceutical intermediate, has been prepared by various methods which generally involve a series of difficult and commercially undesirable reaction steps. Typical of these procedures is a four-step reaction scheme which involves ethylating beta naphthol, brominating the beta ethoxy naphthalene produced, forming the Grignard reagent of the brominated compound, and finally carbonating the Grignard reagent to form the desired 2-ethoxy-1-naphthoic acid. Aside from the high cost inherently involved in such a multi-step process, certain of the reaction steps involved are most difficult to effect with the bromination being particularly difficult to effect to achieve the mono-bromo compound in the yield and purity necessary for a successful process. This method of preparation, accordingly, is not satisfactory for preparing this valuable compound, especially on a commercial scale. A particularly desirable method for preparing this compound, which would avoid the complicated and cumbersome reaction schemes used heretofore, would appear to be the direct ethylation of the hydroxy group of the corresponding hydroxy naphthoic acid. This reaction, however, suffers from the severe disadvantage that the product is obtained in admixture with unreacted hydroxy naphthoic acid, which, because of its similar physical properties to ethoxy naphthoic acid, is extremely difficult to separate and consequently precludes the ready obtainment of a highly pure product.

It has now been discovered, however, that 2-ethoxy-1-naphthoic acid may be prepared directly from the corresponding 2-hydroxy-1-naphthoic acid in high yield and purity in a relatively simple and economical two-reaction step sequence which is conveniently effected without separation of any of the intermediate products produced.

Accordingly, an object of this invention is to provide a simple, direct and economical process for the preparation of 2-ethoxy-1-naphthoic acid. Another object of this invention is to provide a process for the preparation of 2-ethoxy-1-naphthoic acid by ethylation of the corresponding 2-hydroxy-1-naphthoic acid whereby the desired product is obtained in high yield and substantially free of any unreacted hydroxy naphthoic acid starting material. A still further object of this invention is to provide a process for the preparation of 2-ethoxy-1-naphthoic acid by ethylation of the corresponding 2-hydroxy-1-naphthoic acid followed by saponification without isolation of any of the intermediate compounds produced whereby the desired product is obtained economically in high yield and purity and in an industrially desirable manner.

The 2-ethoxy-1-naphthoic acid is prepared according to the process of this invention in general by the combination of ethylating 2-hydroxy-1-naphthoic acid to form primarily the corresponding ethyl ester of 2-ethoxy-1-naphthoic acid followed by saponifying the ester without isolation from the ethylation reaction mixture with an alkali metal hydroxide. The 2-ethoxy-1-naphthoic acid is thereafter readily isolated from the alkaline saponification mixture by acidification.

While the process of this invention may in general be applicable to the preparation of alkoxy naphthoic acids, it is principally designed to prepare specifically 2-ethoxy-1-naphthoic acid which heretofore has proved to be a difficult compound to prepare in high yield and purity.

The first reaction step in the process of this invention, namely ethylation of 2-hydroxy-1-naphthoic acid, is effected by reacting the acid with diethyl sulfate in the presence of an aqueous solution of an alkali metal hydroxide. This ethylation is however, a most difficult reaction to effect to obtain ultimately in the process an ethoxy acid product in an acceptable yield and, most critically, at the level of purity necessary for further industrial utilization. The principal problem involved in this reaction is in effecting the ethylation so as to substantially completely react the 2-hydroxy-1-naphthoic acid and thus avoid the presence of such starting material in admixture with the final product. This problem is avoided in the process of this invention by effecting the ethylation according to a precise combination of processing features which consist of using a definite ratio of reactants and by maintaining, at least, an initial portion of the reaction within a specific temperature range. By conducting the ethylation according to this precise combination of processing features, a product mixture is obtained which is readily saponified, without isolation from the ethylation reaction mixture, to an ethoxy acid product which is easily recovered in high yield and substantially free of the highly contaminating initial starting material, 2-hydroxy-1-naphthoic acid.

To obtain 2-ethoxy-1-naphthoic acid of the desired purity, substantially free of any unreacted starting material, it is essential that the quantity of both the diethyl sulfate and the alkali metal hydroxide used in the ethylation reaction be in excess of at least above about 100 and more preferably above about 125 percent of the stoichiometric quantity required to react with the hydroxy naphthoic acid to form the ethyl ester of 2-ethoxy-1-naphthoic acid. While it is essential that at least two mols of the diethyl sulfate (100 percent excess) and four mols (100 percent excess) of the alkali metal hydroxide be present per mol of hydroxy naphthoic acid, it is not essential that the amount of both reactants be present in an equal level of excess, although it is generally preferred that both be present in an approximately equivalent amount. The amount of the diethyl sulfate and the alkali metal hydroxide used in the reaction may, of course, be much higher than these essential minimum excess levels and may range up to about 300 percent above the stoichiometric quantity required. No substantial improvements are obtained, however, when using quantities much above about 200 percent above the stoichiometric quantity and, accordingly, a range of from about 125 to 200 percent is generally preferred for the reaction.

To obtain 2-ethoxy-1-naphthoic acid in high yield, it is essential that the ethylation reaction, and in particular an initial portion of the reaction be effected within a specific limited temperature range of from about 25° to 60° C. and more preferably within the range of from about 30° to 50° C. Variation of the temperature outside these ranges during the initial portion of the reaction results in a considerable reduction in the yield of product ultimately obtained in the process. This temperature control is only critical, however, for the initial portion of the reaction and while the entire reaction may be satisfactorily effected completely within these ranges, it generally is preferable for economy of operation to complete the reaction within a shorter time by raising the temperature after an initial period of about one to five hours, and more preferably about 1 to 3 hours, to a higher temperature of up to about the reflux temperature of the mixture.

While it is possible in carrying out the ethylation reaction to charge all of the reactants together to a reaction vessel followed by heating to the desired temperature range, it generally is desirable for optimum results and ease of operation to first charge the acid and the alkali metal hydroxide in aqueous solution to a reaction vessel, heat the mixture to the critical temperature range and then, while maintaining this temperature, gradually add the diethyl sulfate to the mixture. Because this reaction is exothermic, the scale on which the reaction is conducted, will to a certain extent, govern the optimum addition time of the diethyl sulfate which may range from about ½ to 5 hours with from about 1 to 3 hours generally being preferred. When the diethyl sulfate is gradually added, the addition time is conveniently used as a measure of the initial portion or period of the reaction during which the temperature must be maintained within the aforesaid critical range. Accordingly, the temperature of the mixture is maintained at the critical temperature range preferably until at least substantially all of the diethyl sulfate has been added. After the initial period of the reaction which preferably constitutes the time required to add the diethyl sulfate, the reacton is advantageously completed by raising the temperature preferably up to reflux and maintaining such elevated temperature for a period of time sufficient to complete the reaction; a period generally requiring from about 1 to 6 hours.

The alkali metal hydroxide which may be used for the ethylation reaction comprises lithium, sodium or potassium hydroxides. Of these hydroxides, however, the most desirable results are obtained with potassium hydroxide and for this reason potassium is the preferred alkali metal hydroxide utilized in the ethylation step of the process. The alkali metal hydroxide is preferably charged as an aqueous solution for ease of handling and as a convenient way of supplying the necessary water for the reaction. Generally the alkali metal hydroxide is charged, within the aforementioned quantity range, as an aqueous solution having a concentration of from about 30 to 50 percent by weight of the alkali metal hydroxide.

The product obtained in the ethylation reaction usually consists of a mixture comprising a major proportion of the ethyl ester of ethoxy naphthoic acid and a minor proportion of the alkali metal salt of ethoxy naphthoic acid which has not completely reacted to form the ester. Most significant, however, is that when the ethylation is effected according to the aforementioned processing features, there exists substantially no unreacted hydroxy naphthoic acid starting material in the reaction mixture to contaminate the final product. Separation of the ethyl ester of the ethoxy naphthoic acid from the ethylation reaction mixture prior to the saponification of the ester is not necessary, and the saponification of the ester is readily effected according to the process of this invention by simply treating the reaction mixture with an alkali metal hydroxide.

The saponification step of the process is accordingly effected by treating the ethyl ester of ethoxy naphthoic acid with an alkali metal hydroxide without separation of the ester from the ethylation reaction mixture. Conveniently this saponification may be carried out by simply charging an additional quantity of alkali metal hydroxide to the ethylation reaction mixture and this may be effected at the end of the ethylation reaction even while the mixture is still refluxing. The temperature of the saponification mixture is then advantageously maintained at reflux for a period of time sufficient to effect the desired saponification; a period usually requiring from about 3 to 6 hours. The alkali metal hydroxide used to effect the saponification may be any of the aforementioned hydroxides used in the ethylation step of the process with potassium hydroxide again being particularly preferred. The quantity of the metal hydroxde used is not critical and a stochiometric amount based upon the ester present in the ethylation mixture is generally satisfactory. In determining the quantity of the ethyl ester of ethoxy naphthoic acid present in the ethylation mixture it may be assumed that all of the charged hydroxy naphthoic acid has been converted to the ester.

In effecting the saponification according to this invention, it is essential that there also be present in the reaction mixture a quantity of methyl or ethyl alcohol, with methyl alcohol being highly preferred, to facilitate the saponification. If the alcohol is not present, the rate of saponification is extremely slow and the saponification requires such a prolonged period to effect as to render the process of this invention unsatisfactory for commercial utilization. Moreover, because of the relative instability of the product under saponification conditions, a lengthy saponification period has a deleterious effect upon product yield. The quantity of the alcohol is not critical and a quantity by weight approximately equal to from about one half to one times the weight of the charged hydroxy naphthoic acid is usually satisfactory.

When the saponification is complete, the alkali metal salt of ethoxy naphthoic acid produced in the saponification as well as the minor quantity of such salt existing originally in the ethylation mixture prior to saponification is converted to the desired 2-ethoxy-1-naphthoic acid by acidifying the saponification mixture with an appropriate acid. Generally, any relatively strong mineral or organic acid may be used for this purpose such as, for example, hydrochloric, sulfuric, phosphoric, or acetic acids. The acid is added to the mixture in a quantity sufficient to produce a low pH of the order of about 1 to 3 and until no further separation of product takes place. If desired, the isolation of the product may be facilitated by first diluting the saponification mixture with water, filtering undissolved inorganic solids and extracting any undissolved organic materials from the mixture by use of a suitable solvent such as toluene prior to acidifying the mixture.

The product separates from the acidified saponification mixture as an oily layer which generally quickly crystallizes at ordinary temperatures of about 25° C. and may be readily recovered from the mixture by filtration and thereafter washed to neutral with water. A completely satisfactory product substantially free of unreacted hydroxy naphthoic acid as manifested by a negative ferric chloride color test is thereupon obtained by simply drying the washed product. If desired, the product may be further treated to obtain an extremely pure 2-ethoxy-1-naphthoic acid by recrystallizing the product from a suitable solvent such as benzene or toluene.

The following examples illustrate the process of this invention but are not intended to limit the invention in strict accordance therewith:

In the following examples the ethoxy naphthoic acid products were tested for the presence of unreacted hydroxy naphthoic acid by means of the ferric chloride color test for phenols which comprised adding a few drops of a saturated aqueous ferric chloride solution to a small quantity of the product dissolved in methanol. A blue color indicated the presence of unreacted acid starting material.

EXAMPLE I 2-ethoxy-1-naphthoic acid was prepared according to the process of this invention by the following procedure:

About 23.5 grams (0.125 mol) of 2-hydroxy-1-naphthoic acid and 76.1 grams of a 37 percent aqueous potassium hydroxide solution (0.5 mol KOH, 100% above theory) were charged to a reaction flask equipped with stirring and heating means. With the temperature of the stirred mixture maintained at about 30° C., about 58 grams (0.375 mol, 200% above theory) of diethyl sulfate were added over a period of about 1 hour by means of an addition funnel. After the addition was complete the temperature was increased to reflux temperature (about 95° C.) and maintained thereat for about one hour. The product thus formed, comprising a mixture of the potassium salt of ethoxy naphthoic acid and the ethyl ester of ethoxy naphthoic acid was subjected to a saponification treatment without separation of the product from the reaction mixture by adding about 12.5 grams of potassium hydroxide pellets (85 percent KOH) dissolved in about 21 grams of a 50 percent by weight aqueous methanol solution. After the addition was complete the mixture was maintained at refluxing temperature (85–90° C.) for about 5 hours. The mixture was then cooled to about 25° C. and about 300 grams of water were added and the insoluble inorganic materials separated by filtration and discarded. Toluene was added and the resulting organic toluene layer was separated from the aqueous alkaline layer. The aqueous alkaline layer was acidified to a pH of 1 to 2 by adding concentrated hydrochloric acid. The product formed an oily layer which crystallized rapidly and was separated by filtration, washed to neutral with water, and thereafter dried. Upon recrystallization from toluene about 21.6 grams of a product having a melting point of 144° to 146° C., and constituting a yield of 80 percent were obtained. The product was free of unreacted hydroxy naphthoic acid as evidenced by a negative ferric chloride color test.

EXAMPLE II 2-ethoxy-1-naphthoic acid was prepared according to the process of this invention by the following procedure:

About 23.5 grams (0.125 mol) of 2-hydroxy-1-naphthoic acid and 91 grams of a 37 percent aqueous potassium hydroxide solution (0.6 mol KOH; 140% above theory) were charged to a reaction flask equipped with stirring and heating means. With the temperature of the stirred mixture maintained at about 35° to 40° C., about 46 grams (0.3 mol, 140% above theory) of diethyl sulfate were added over a period of about 3 hours by means of an addition funnel. After the addition was complete the temperature was increased to about 50° C. and maintained thereat for about one hour and thereafter increased to reflux temperature of about 90° C. and maintained thereat for another hour. The product thus formed, comprising a mixture of the potassium salt of ethoxy naphthoic acid and the ethyl ester of ethoxy naphthoic acid, was subjected to a saponification treatment without separation of the products from the reaction mixture by adding about 33 grams of potassium hydroxide pellets (85% KOH) dissolved in about 59 grams of a 50 percent by weight aqueous methanol solution. After the addition was complete the mixture was maintained at refluxing temperature (85–90° C.) for about 5 hours. The mixture was then cooled to about 25° C. and about 250 grams of water were added and the insoluble inorganic materials separated by filtration and discarded. Toluene was added and the resulting organic toluene layer was separated from the aqueous alkaline layer. The aqueous alkaline layer was acidified to a pH of about 1 to 2 by adding about 60 grams of concentrated hydrochloric acid. The product separated as an oily layer which crystallized rapidly and was separated by filtration, washed to neutral with water and thereafter dried under vacuum to recover 22.6 grams of a product having a melting point of 138° to 141° C. The product was free of unreacted hydroxy naphthoic acid as manifested by a negative ferric chloride color test. Upon recrystallization from toluene, about 21 grams of a product were obtained melting at 144° to 146° C. and constituting a yield of 78 percent.

EXAMPLE III 2-ethoxy-1-naphthoic acid was prepared according to the process of this invention by the following procedure:

About 23.5 grams (0.125 mol) of 2-hydroxy-1-naphthoic acid and 91 grams of a 37 percent aqueous potassium hydroxide solution (0.6 mol KOH, 140% above theory) were charged to a reaction flask equipped with stirring and heating means. With the temperature of the stirred mixture maintained at about 50° C., about 46 grams (0.3 mol, 140% above theory) of diethyl sulfate were added over a period of about 3 hours by means of an addition funnel. After the addition was complete, the temperature was maintained at about 50° C. for about another hour and thereafter increased to reflux temperature of about 90° C. and maintained thereat for about an hour. The product mixture thus formed, comprising a mixture of the potassium salt of ethoxy naphthoic acid and the ethyl ester of ethoxy naphthoic acid, was subjected to a saponification treatment without separation of the products from the reaction mixture by adding about 33 grams of potassium hydroxide pellets (85% KOH) dissolved in about 59 grams of a 50 percent by weight aqueous methanol solution. After the addition was complete the mixture was maintained at refluxing temperature (85–90° C.) for about 5 hours. The mixture was then cooled to about 25° C. and about 250 grams of water were added and the insoluble inorganic materials separated by filtration and discarded. Toluene was added and the resulting organic toluene layer was separated from the aqueous alkaline layer. The aqueous alkaline layer was acidified to a pH of about 1 to 2 by adding about 60 grams of concentrated hydrochloric acid. The product formed an oily layer which crystallized rapidly and was separated by filtration, washed to neutral with water and thereafter dried under vacuum to recover about 21.2 grams of a product having a melting point of 137° to 141° C. and constituting a yield of 78 percent. The product was free of unreacted hydroxy naphthoic acid as manifested by a negative ferric chloride color test for phenol.

EXAMPLE IV

The following experiments are cited to demonstrate the criticality, in respect to product yield, of the temperature range maintained during the initial portion of the ethylation reaction and particularly during the addition of the diethyl sulfate. In part A the temperature was lower than the critical range of 25° to 60° C. and in part B the temperature was higher.

(A) About 23.5 grams (0.125 mol) of 2-hydroxy-1-naphthoic acid and 76.1 grams of a 37 percent aqueous potassium hydroxide solution (0.5 mol KOH, 100% above theory) were charged to a reaction flask equipped with stirring and heating means. With the temperature of the stirred mixture maintained at about 5° to 10° C., about 58 grams (0.375 mol, 200% above theory) of diethyl sulfate were added over a period of about 1 hour. After the addition was complete the temperature was maintained at 5° to 10° C. for another hour, increased to 25° to 30° C. and maintained thereat for about 3 hours and finally increased to reflux temperature of about 95° C. and maintained thereat for about 2 hours. The product mixture thus formed, comprising a mixture of the potassium salt of ethoxy naphthoic acid and the ethyl ester of ethoxy naphthoic acid, was subjected to a saponification treatment without separation of the products from the reaction mixture by adding about 12.5 grams of potassium hydroxide pellets (85% KOH) dissolved in about 21 grams of a 50 percent by weight aqueous methanol solution. After the addition was complete the mixture was maintained at refluxing temperature (85°–90° C.) for about 5 hours. The mixture was then cooled to about 25° C. and about 300 grams of water were added and the insoluble materials separated by filtration and discarded. Toluene was added and the resulting organic toluene layer was separated from the aqueous alkaline layer. The aqueous alkaline layer was acidified to a pH of about 1 to 2 by adding concentrated hydrochloric acid. The product formed an oily layer which crystallized rapidly and was separated by filtration, washed to neutral with water and thereafter dried under vacuum to recover about 18.0 grams of a product having a melting point of 141.5° to 143.5° C. and constituting a yield of 60 percent. The product was free of unreacted hydroxy naphthoic acid as manifested by a negative ferric chloride color test.

(B) About 23.5 grams (0.125 mol) of 2-hydroxy-1-naphthoic acid and 76.1 grams of a 37 percent aqueous potassium hydroxide solution (0.5 mol KOH, 100% above theory) were charged to a reaction flask equipped with stirring and heating means. With the temperature of the stirred mixture maintained at about 75° to 80° C., about 58 grams (0.375 mol, 200% above theory) of diethyl sulfate were added over a period of about 1 hour. After the addition was complete the temperature was increased to reflux at about 90° C. and maintained thereat for about 1.5 hours. The product thus formed, comprising a mixture of the potassium salt of ethoxy naphthoic acid and the ethyl ester of ethoxy naphthoic acid, was subjected to a saponification treatment without separation of the products from the reaction mixture by adding about 12.5 grams of potassium hydroxide pellets (85% KOH) dissolved in about 21 grams of a 50 percent by weight aqueous methanol solution. After the addition was complete the mixture was maintained at refluxing temperature (85°–90° C.) for about 5 hours. The mixture was then cooled to about 25° C. and about 300 grams of water were added and the insoluble inorganic materials separated by filtration and discarded. Toluene was added and the resulting organic toluene layer was separated from the aqueous alkaline layer. The aqueous alkaline layer was acidified to a pH of about 1 to 2 by adding concentrated hydrochloric acid. The product formed an oily layer which crystallized rapidly and was separated by filtration, washed to neutral with water, and thereafter dried under vacuum to recover about 15.0 grams of product having a melting point of 141°–143° C., and constituting a 56 percent yield. The product was free of hydroxy naphthoic acid as indicated by a negative ferric chloride color test.

EXAMPLE V

The following experiments are cited to demonstrate the criticality, in respect to product purity, of the ratio of reactants utilized in the ethylation step of the process. In part A both the alkali metal hydroxide and the diethyl sulfate were used in an excess of 50 percent above theory and in part B both the reactants were used in an excess of 100 percent above theory.

(A) About 47.0 grams (0.25 mol) of 2 - hydroxy - 1-naphthoic acid and 114 grams of a 37 percent aqueous potassium hydroxide solution (0.75 mol KOH, 50% above theory) were charged to a reaction flask equipped with stirring and heating means. With the temperature of the stirred mixture maintained at about 35° to 40° C., about 58 grams (0.375 mol, 50% above theory) of diethyl sulfate were added over a period of about 3 hours. After the addition was complete the temperature was maintained at about 50° C. for another hour, and finally increased to reflux temperature of about 95° C. and maintained thereat for about 1 hour. The product mixture thus formed was subjected to a saponification treatment without separation from the ethylation reaction mixture by adding about 33 grams of potassium hydroxide pellets (85% KOH) dissolved in about 59 grams of a 50 percent by weight aqueous methanol solution. After the addition was complete the mixture was maintained at refluxing temperature (85°–90° C.) for about 5 hours. The mixture was then cooled to about 25° C. and about 250 grams of water were added and the insoluble inorganic materials separated by filtration and discarded. Toluene was added and the resulting organic toluene layer was separated from the aqueous alkaline layer. The aqueous alkaline layer was acidified to a pH of about 1 to 2 by adding concentrated hydrochloric acid. The product formed an oily layer which crystallized rapidly and was separated by filtration, washed to neutral with water and thereafter dried under vacuum to recover about 43.7 grams of a product melting from 115° to 132° C. and giving a strong positive ferric chloride color test for unreacted hydroxy naphthoic acid. This product was recrystallized from toluene to recover about 32.8 grams of product having a melting point of from 135° to 140° C. and constituting a 70 percent yield. This recrystallized product also contained unreacted hydroxy naphthoic acid as evidenced by a positive ferric chloride color test.

(B) About 47.0 grams (0.25 mol) of 2 - hydroxy - 1-naphthoic acid and 152 grams of a 37 percent aqueous potassium hydroxide solution (1.0 mol KOH, 100% above theory) were charged to a reaction flask equipped with stirring and heating means. With the temperature of the stirred mixture maintained at about 35° to 40° C., about 77.1 grams (0.5 mol, 100% above theory) of diethyl sulfate were added over a period of about 3 hours. After the addition was complete the temperature was increased to about 50° C. and maintained thereat for about an hour and then raised to reflux of about 95° C. and maintained thereat for about another hour. The product thus formed was subjected to a saponification treatment without separation from the ethylation reaction mixture by adding about 66 grams of potassium hydroxide pellets (85% KOH) dissolved in about 120 grams of a 50 percent by weight aqueous methanol solution. After the addition was complete the mixture was maintained at refluxing temperature (85°–90° C.) for about 5 hours. The mixture was then cooled to about 25° C. and about 250 grams of water were added and the insoluble inorganic materials separated by filtration and discarded. Toluene was added and the resulting organic toluene layer was separated from the aqueous alkaline layer. The aqueous alkaline layer was acidified to a pH of about 1 to 2 by adding concentrated hydrochloric acid. The product formed an oily layer which crystallized rapidly and was separated by filtration, washed to neutral with water, and thereafter dried under vacuum to recover about 45.5 grams of product melting from 115° to 132° C. and giving a positive ferric chloride color test. This product was recrystallized from toluene to recover about 40.1 grams of product having a melting point of 137° to 144° C. and constituting a 78 percent yield. This product also contained unreacted hydroxy naphthoic acid as evidenced by a positive ferric chloride color test.

We claim as our invention:

1. Process for producing 2 - ethoxy - 1 - naphthoic acid which comprises: (A) reacting 2 - hydroxy - 1-naphthoic acid with diethyl sulfate in the presence of an aqueous solution of an alkali metal hydroxide at a temperature at least initially within the range of from about 25° to 60° C. with both the diethyl sulfate and the alkali metal hydroxide being present in excess above about 100 percent of the stoichiometric quantity required to form the corresponding ethyl ester of ethoxy naphthoic acid; (B) subjecting the resultant reaction products to a saponification treatment with an alkali metal hydroxide in the presence of an alcohol selected from the group consisting of methyl and ethyl alcohols (C) acidifying the saponified mixture; and (D) recovering the desired product.

2. Process for producing 2 - ethoxy - 1 - naphthoic acid which comprises: (A) gradually adding diethyl sulfate to a mixture of 2 - hydroxy - 1 - naphthoic acid and an aqueous solution of an alkali metal hydroxide, maintaining the temperature of the mixture at least initially within the range of from about 25° to 60° C., maintaining an excess of both the diethyl sulfate and the alkali metal hydroxide above about 100 percent of the stoichiometric quantity required to form the corresponding ethyl ester of ethoxy naphthoic acid; (B) subjecting the resultant reaction products without isolation from the reaction mixture to a saponification treatment with an alkali metal hydroxide in the presence of an alcohol selected from the group consisting of methyl and ethyl alcohols; (C) acidifying the saponified mixture; and (D) recovering the desired product.

3. Process for producing 2 - ethoxy - 1 - naphthoic acid which comprises: (A) gradually adding diethyl sulfate to a mixture of 2 - hydroxy - 1 - naphthoic acid and an aqueous solution of potassium hydroxide, maintaining the temperature of the mixture at least initially within the range of from about 25° to 60° C., maintaining an excess of both the diethyl sulfate and the potassium hydroxide above about 125 percent of the stoichiometric quantity required to form the corresponding ethyl ester of ethoxy naphthoic acid; (B) subjecting the resultant reaction products without isolation from the reaction mixture to a saponification treatment with potassium hydroxide in the presence of methyl alcohol; (C) acidifying the saponified mixture; and (D) recovering the desired product.

4. Process for producing 2 - ethoxy - 1 - naphthoic acid which comprises: (A) gradually adding diethyl sulfate to a mixture of 2 - hydroxy - 1 - naphthoic acid and potassium hydroxide, maintaining the temperature of the mixture at least initially within the range of from about 30 to 50° C. maintaining an excess of both the diethyl sulfate and the potassium hydroxide above about 125 percent of the stoichiometric quantity required to form the corresponding ethyl ester of ethoxy naphthoic acid; (B) subjecting the resultant reaction products without isolation from the reaction mixture to a saponification treatment with potassium hydroxide in the presence of methyl alcohol; (C) acidifying the saponified mixture; and (D) recovering the desired product.

5. Process for producing 2 - ethoxy - 1 - naphthoic acid which comprises: (A) gradually adding diethyl sulfate over a period of from about 1 to 5 hours to a mixture of 2 - hydroxy - 1 - naphthoic acid and an aqueous solution of potassium hydroxide, maintaining the temperature of the mixture within the range of from about 30° to 50° C. during the addition and completing the reaction at a higher temperature of up to about 100° C., maintaining an excess of both the diethyl sulfate and the potassium hydroxide above about 125 percent of the stoichiometric quantity required to form the corresponding ethyl ester of ethoxy naphthoic acid; (B) subjecting the resultant reaction products without isolation from the reaction mixture to a saponification treatment with potassium hydroxide in the presence of methyl alcohol; (C) acidifying the saponified mixture; and (D) recovering the desired product.

6. Process for producing 2 - ethoxy - 1 - naphthoic acid which comprises: (A) gradually adding diethyl sulfate over a period of from about 1 to 3 hours to a mixture of 2 - hydroxy - 1 - naphthoic acid and an aqueous solution of potassium hydroxide, maintaining the temperature of the mixture within the range of from about 30° to 50° C. during the addition and completing the reaction at a higher temperature of up to about 100° C., maintaining an excess of both the diethyl sulfate and the potassium hydroxide above about 125 percent of the stoichiometric quantity required to form the corresponding ethyl ester of ethoxy naphthoic acid; (B) subjecting the resultant reaction products without isolation from the reaction mixture to a saponification treatment with potassium hydroxide in the presence of methyl alcohol; (C) acidifying the saponified mixture; and (D) recovering the desired product.

References Cited

Hirwe et al.: Chem. Abstr., 49; 11594i.
Morrison et al.: "Organic Chemistry," Allyn and Bacon, Boston, 1959, p. 413.

HENRY R. JILES, *Primary Examiner.*

D. STENZEL, *Assistant Examiner.*